Figure 1:
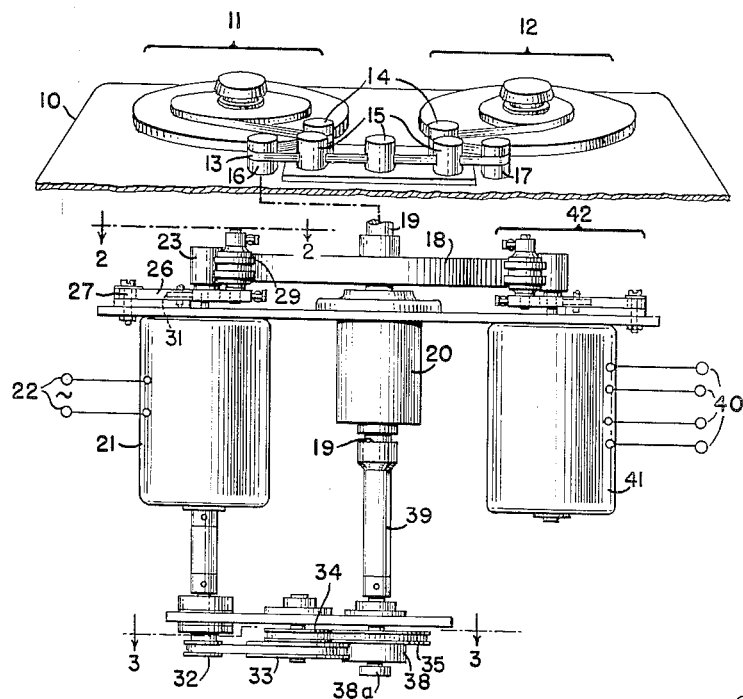

Dec. 4, 1951  D. G. C. HARE  2,577,190
PRECISION DRIVING SYSTEM
Filed March 7, 1950  3 Sheets-Sheet 1

INVENTOR.
DONALD G.C. HARE
BY Lawrence B Dodds
ATTORNEY

Dec. 4, 1951  D. G. C. HARE  2,577,190
PRECISION DRIVING SYSTEM
Filed March 7, 1950  3 Sheets-Sheet 2

INVENTOR.
DONALD G.C. HARE
BY Laurence B. Dodds
ATTORNEY

Patented Dec. 4, 1951

2,577,190

UNITED STATES PATENT OFFICE 2,577,190

PRECISION DRIVING SYSTEM

Donald G. C. Hare, Stamford, Conn.

Application March 7, 1950, Serial No. 148,123

12 Claims. (Cl. 318—70)

This invention relates to precision driving systems and, while it is of general application, it is particularly suitable for embodiment in a high-quality studio-type magnetic-tape recorder-reproducer apparatus and will be specifically illustrated and described in such an embodiment.

There are two fundamental requirements which should be fulfilled by a high-quality studio-type magnetic-tape recorder-reproducer apparatus. The first requirement is that the motion of the tape, that is, the first time-derivative of its displacement, should be extremely smooth. Specifically, the instantaneous velocity should be maintained equal to the average velocity within very close tolerances, for example, 0.1 per cent or less, to avoid objectionable "wow" or frequency modulation of the signal. A second requirement is that, assuming an absolutely constant-frequency power supply, the elapsed time for playing-back a given program or, conversely, the integrated displacement or total number of revolutions in a given time, should be maintained constant to a high degree of accuracy; for example, the elapsed playing time for a one-hour program should be maintained within two seconds. The reason for this second requirement is that recorder-reproducer apparatus of the type described is frequently used in connection with auxiliary equipment which is synchronized with the power-supply circuit, for example, a motion picture projector driven by a synchronous motor.

In the present state of the art, there are two general categories of drive mechanisms for the above-described recorder-reproducer systems, both of which are powered by synchronous motors. The first of these is the class of so-called "friction drives," which in general have the advantage of very smooth operation. Using relatively inexpensive friction idlers, commonly called "pucks," as a method of coupling the synchronous motor to the drive shaft, an efficient and smooth motion is obtained. Furthermore, the puck acts as a stiff coupling to the drive motor and hence offers a large damping effect for perturbations of motion introduced by other components of the drive mechanism. However, since the puck drive system, as well as other friction drive systems, is essentially a slip-operated device subject to creepage, in order to maintain the integrated displacement to the degree of accuracy desired, the slip must be held to within one part in several thousand. Experience shows that this cannot be economically and practically realized with materials at hand.

The second general method of coupling the synchronous motor to the drive shaft is to make use of a gear train or cog belt, which ensures exact integrated synchronization of the drive shaft with the power-supply frequency. Thus, neglecting tape stretch or slippage of the tape over the drive-capstan, the integrated error is substantially zero, no matter how long the playing time. The major drawback of this system is the inherent ripple or variation in instantaneous velocity due to the action of the teeth of the gears or cog belt. This can be eliminated without loss of synchronizing action by use of a soft or resilient coupling in the gear train between the motor and the main drive shaft. If, however, this coupling has sufficient resiliency to isolate the effects of gear ripple from the main shaft, then the drive shaft and its associated flywheel have little or no damping and thus offer little or no resistance to hunting or to other variations in instantaneous velocity introduced by other components of the system. Insertion of damping on the main shaft means increases the load on the drive motor and introduction of sufficient damping to effect adequate reduction of instantaneous velocity variations, and at the same time allow a reasonable starting time, would increase the required size of the drive motor to an unreasonable extent.

It is an object of the present invention, therefore, to provide a new and improved precision driving system which obviates one or more of the above-mentioned disadvantages of the prior-art driving systems.

It is another object of the invention to provide a new and improved precision driving system which is particularly suitable for use in a studio-type magnetic-tape recorder-reproducer apparatus by means of which one or more of the following desirable characteristics are achieved: the integrated displacement error or slip in the drive is reduced to substantially zero; the undesirable inherent variations in the instantaneous velocity of the record tape, or the like, are substantially eliminated; adequate damping of the driving system is provided to effect a precisely uniform velocity; and the movement of the record tape, or the like, may be synchronized with an independent timing source of regular or irregular periodicity.

In accordance with the invention, a precision driving system comprises a driven output member, a power-supply means including a main power source and a reference timing source, and a non-rigid driving linkage between the power source and the output member. The system also comprises a mechanism interconnecting the timing source and the output member and including an auxiliary driving means for the output member effective to limit the maximum displacement between the timing source and the output member.

Further in accordance with the invention, a precision driving system comprises a driven output member, a driving motor, and a non-rigid driving linkage between the motor and the output member. The system also comprises a mechanism interconnecting the motor and the output member and including means responsive to the displacement therebetween, and an auxiliary driving means for the output member controlled by the responsive means to limit the maximum displacement between the motor and the output member.

Further in accordance with the invention, in an electro-acoustical record recording-reproducing apparatus including a rotatable record supporting and driving member, there is provided a precision driving system comprising power-supply means including a main power source, reference timing means operative during recording for impressing on a record a reference timing signal, and a non-rigid driving linkage coupled to the power source and adapted to be coupled to a record driving member. The system also comprises means operative during reproducing and responsive to the relative phase of the timing signal and the power source, and an auxiliary driving means for a coupled driving member controlled by the responsive means to limit the maximum displacement between the timing signal and a coupled driving member.

Further in accordance with the invention, in a precision driving system, there is provided a non-rigid driving linkage comprising a rigid cylindrical driving member, a rigid cylindrical driven member, a pair of resilient pucks engaging both of the members, and means for biasing the pucks toward mutual engagement.

As used herein and in the appended claims, the term "non-rigid" driving linkage means a linkage of the elastic, hydraulic or pneumatic types, or equivalent, in which there is no rigid driving connection to maintain the driving member and the driven member in synchronism. The term "responsive to displacement" between two members or quantities, as used herein and in the appended claims, is used to refer to an instantaneous space or phase displacement, that is, an integrated difference in velocity between the two members. The power source and the timing source, referred to herein and in the appended claims, may be separate sources or may be combined as a single source.

For a better understanding of the present invention, together with other and further objects thereof, reference is had to the following description taken in connection with the accompanying drawings, and its scope will be pointed out in the appended claims.

Figure 2:
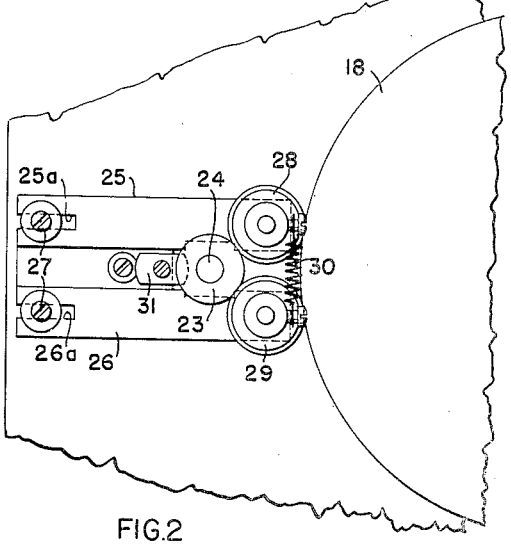
Figure 3:
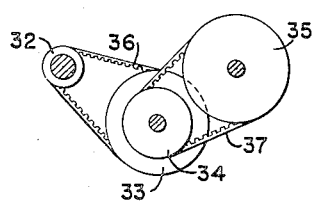
Figure 6:
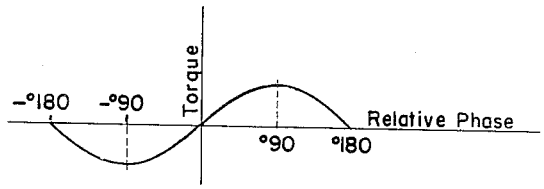
Figure 7:
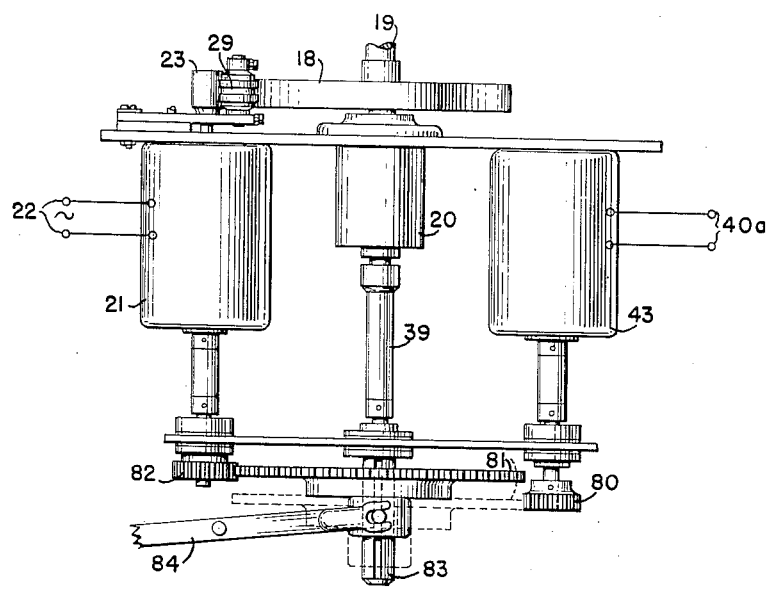
Figure 4:
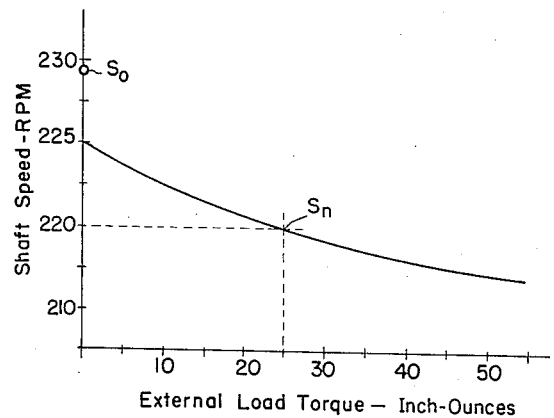
Figure 5:
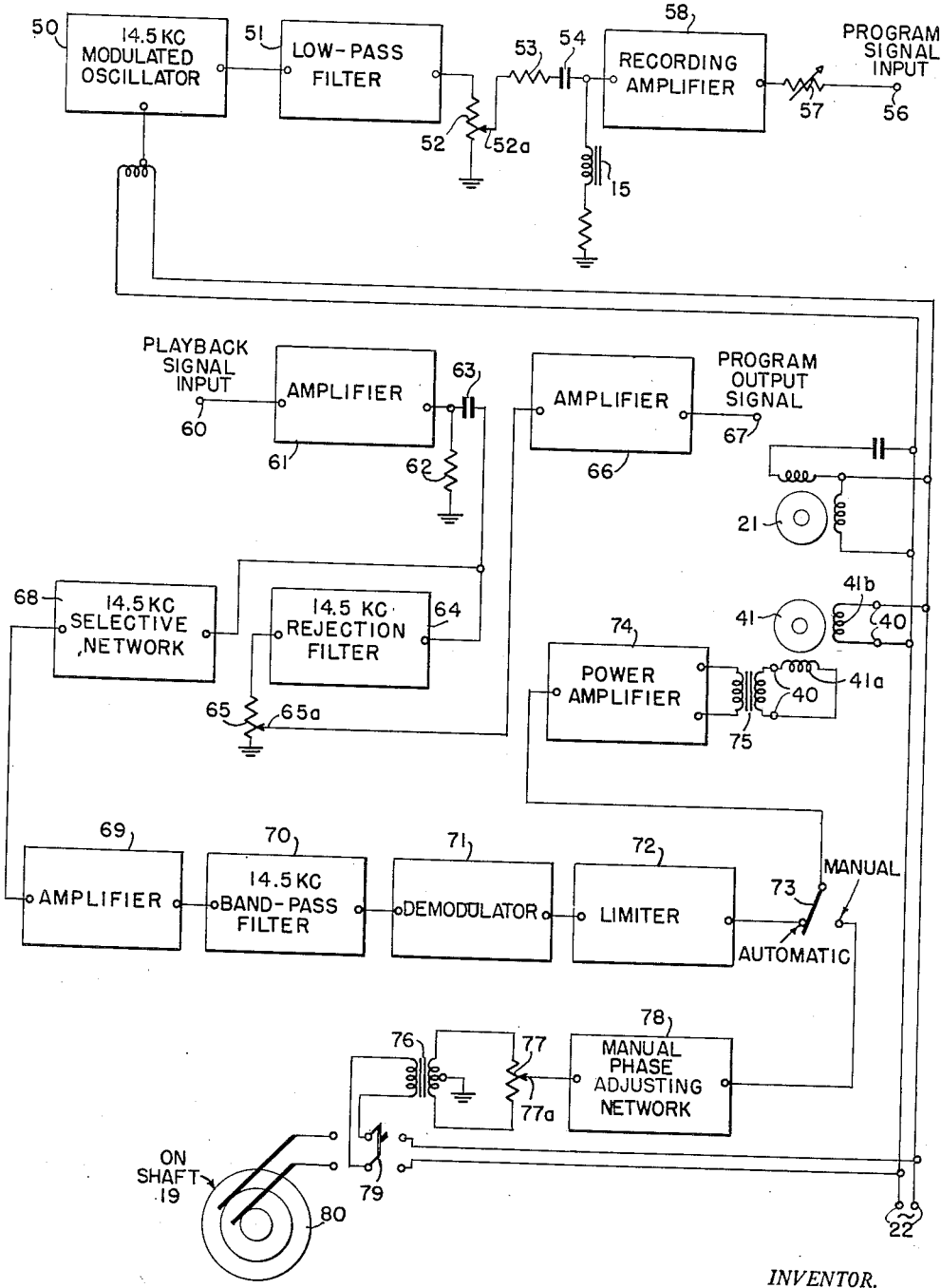

Referring now to the drawings, Fig. 1 is a view in elevation of a precision driving system embodying the invention as applied to an electro-acoustical record recording-reproducing apparatus; Fig. 2 is a detailed plan view of a puck driving linkage embodied in the system of Fig. 1; Fig. 3 is a detailed plan view of an auxiliary driving linkage embodied in the system of Fig. 1; Fig. 4 is a graph of an operating characteristic of the apparatus of Fig. 1 to aid in the explanation of the invention; Fig. 5 is a schematic single-line diagram of an electrical system suitable for use in conjunction with the driving system of Fig. 1; Fig. 6 is an operating characteristic of the auxiliary power source of the apparatus of Fig. 1; while Fig. 7 is a view in elevation of a modified form of precision driving system embodying the invention.

Referring now to Fig. 1, there is illustrated, partially schematically, a complete electro-acoustical record-translating apparatus, specifically, a recording-reproducing apparatus in which the precision driving system of the invention is embodied. This apparatus comprises a supporting frame 10 carrying on its upper face a pair of reel assemblies 11, 12 which may be of conventional construction or may be constructed as described and claimed in the copending application of Wentworth D. Fling, Serial No. 126,518, filed November 10, 1949. A magnetic tape 13 which is being unwound from one of the reel assemblies, for example, the assembly 11, and rewound on the other reel assembly 12 passes around a pair of idler rollers 14; play-back, record, and erasing heads, collectively referred to as 15, since they represent no part of the present invention; a driving capstan 16, and an inertia idler roller 17. Each of the reel assemblies 11 and 12 constitutes a rotatable member for supporting the reels of magnetic tape 13, the tape being unwound from the reel assembly 11 by capstan 16 and being rewound on the reel assembly 12. The precision driving system includes a driven output member, such as a flywheel 18, connected by way of shaft 19 to capstan 16 and thus constituting a record-driving member. The shaft 19 is supported in a suitable thrust and sleeve bearing 20.

The driving system also includes a power-supply means including a main power source, such as a synchronous motor 21, connected to be energized from supply circuit terminals 22, which may be connected to a conventional 60-cycle commercial alternating-current circuit. The terminals 22 may also comprise a reference timing source, that is, a source of periodic electrical signals.

The driving system also includes a non-rigid driving linkage between the power source or motor 21 and the output member or flywheel 18, such linkage being subject to creepage or slip. This non-rigid linkage system is shown in detail in Fig. 2 and comprises a rigid cylindrical driving member, such as a conventional steel roller 23 attached to the shaft 24 of motor 21, and a rigid cylindrical driven member, specifically, the flywheel 18. The driving linkage also includes a pair of elongated adjacent arms 25 and 26 mounted for pivotal movement as by pivot pins 27, 27 and mounted for longitudinal movement by virtue of slots 25a, 26a in the arms 25 and 26, respectively. A pair of resilient pucks 28, 29 are individually mounted at the free ends of the arms 25, 26, respectively, and are disposed to engage both the driving roller 23 and the flywheel 18.

The non-rigid driving linkage also includes means for biasing the pucks 28, 29 for mutual engagement. This means may take the form of a tension spring 30 connected to the outer ends of the arms 25 and 26 and biasing them toward engagement with each other. A cam 31 having a manual operating lever (not shown) is disposed between the arms 25 and 26 and is effective, upon operation, to separate the arms, and thus the pucks 28 and 29, for effective disconnection of the driving linkage.

The precision driving system further includes a mechanism interconnecting the timing source and the output member or flywheel 18 and including an auxiliary driving means for the flywheel 18 effective to limit the maximum displacement between the timing source and the output member. When the timing source is the supply terminals 22 and the driving motor 21 is of the synchronous type, this mechanism and auxiliary driving means may take the form of a rigid driving mechanism and a resilient deformable element interconnecting the motor 21 and the flywheel 18. The rigid driving mechanism may take the form of a series of toothed pulleys 32, 33, 34, and 35 and the driving cog belts 36 and 37, the pulleys 32—35, inclusive, being proportioned to provide an appropriate gear ratio between the motor 21 and the shaft 19 of flywheel 18, which is preferably slightly less than that provided by the non-rigid drive between the roller 23 and the flywheel 18. A clutch 38 of any conventioned type having an operating member 38a may be provided for disengaging this rigid driving mechanism. The resilient deformable element may comprise a soft rubber coupling 39 interposed between the pulley 35 and the shaft 19 of flywheel 18.

In the event that the timing source of the driving system is independent of the supply circuit terminals 22, for example, terminals 40 connected to a source of periodic electrical signals, the motor 21 may be of a non-synchronous type, such as an induction motor. In this case the auxiliary driving means may be in the form of an auxiliary correcting motor 41, connected to the terminals 40 and arranged to drive the flywheel 18 through a non-rigid puck driving linkage 42 which may be in all respects similar to the main driving linkage represented in Fig. 2. While this driving linkage is non-synchronous and subject to some creepage, it constitutes essentially a correcting or rating driving system which need apply to the flywheel 18 only a small fraction of the power supplied by the main driving motor 21, as explained hereinafter. When the auxiliary driving motor 41 is in operation, obviously the clutch 38 is disengaged to disconnect the flywheel 18 from the motor 21 through the rigid driving mechanism comprising the pulleys 32—35, inclusive, and the cog belts 36, 37.

The operation of the precision driving system of Fig. 1 may be explained first assuming that the clutch 38 is engaged and that the terminals 40 are de-energized, so that the motor 41 is idling, or that the driving mechanism 42 is disengaged as by operation of its disengaging cam 31 (Fig. 2). Under these conditions, the power to the flywheel 18 is supplied primarily by motor 21 through the non-rigid puck linkage mechanism. Due to the resilience of the driving pucks 28, 29 and the absence of any gearing or equivalent in this drive, the flywheel 18 is driven at an extremely uniform velocity with substantially a complete absence of the ripples or speed fluctuations, characteristic of gear drives, which introduce frequency modulation or "wows" of the signal during reproduction. However, as stated above, this type of a resilient drive is subject to some slippage or creepage so that the flywheel 18 is not maintained in exact synchronism with the supply terminals 22; specifically, the rotational velocity of the flywheel is not that corresponding to the speed of motor 21 multiplied by the drive ratio.

However, the auxiliary driving mechanism comprising the pulleys 32—35, inclusive, and cog belts 36 and 37 driven by the synchronous motor 21 provide a rigid driving mechanism between the supply terminals 22 and the shaft 19. The soft rubber coupling element 39 permits a definite and limited displacement between the flywheel 18 and the shaft of the motor 21. Obviously, if this phase displacement tends to increase above normal value, the increased angular deflection of the element 39 increases the torque on the shaft 19 of flywheel 18 to restore those elements to their normal phase relation. As mentioned above, the gear ratio provided by the elements 32—37, inclusive, between the motor 21 and the shaft 19 is preferably somewhat less than that between these elements provided by the non-rigid puck driving linkage so that the latter tends to drive shaft 19 slightly above its normal speed and the rigid driving mechanism effectively loads the non-rigid driving system.

The speed-torque operating characteristic of one non-rigid driving system constructed in accordance with Fig. 1 is represented in Fig. 4. In this embodiment, motor 21 was a synchronous motor having a synchronous speed of 1800 R. P. M. and the effective drive ratio of the driving system was such that the theoretical synchronous speed $S_0$ of shaft 19, in the absence of all loads, was 229.5 R. P. M. It is noted that the actual speed with no external applied load and with only the bearing friction and inherent slip in the driving system has effected a reduction in speed of approximately 2 per cent to 225 R. P. M. It is seen from the curve of Fig. 4 that the speed of shaft 19 decreases approximately linearly with increase of external applied torque. With other designs, for example, with pucks of other materials and other effective drive ratios, the shape of the characteristic curve is basically similar to that of Fig. 4, but may be shifted bodily with respect to the speed axis and may change in slope.

Since the puck drive is loaded down by the rigid driving system, as described, the pucks 28, 29 in operation tend to pull together, increasing the load on the puck drive and decreasing the load on the rigid driving system. In other words, the rigid driving system 32—37, inclusive, acts as a variable load on the puck driving system and holds the speed of shaft 19 at a fixed normal speed determined by the gear ratio of the rigid driving system; for example, at the point $S_n$ on the curve of Fig. 4 at which the external applied torque is 25 inch-oz. This torque is made up of the load of the rigid gear driving system, friction, tape pull, etc. When any of the variable loads change, or the characteristic of the puck driving system changes, the amount of back torque applied by the gear driving system automatically changes to compensate therefor and holds the speed of shaft 19 precisely at its normal value $S_n$.

Any short period perturbations, such as gear ripples, are effectively filtered out by the compliance of the elastic coupling 39, the inertia of the flywheel 18, and the damping of the non-rigid puck drive, these elements effectively constituting a mechanical low-pass filter system. From the long-time viewpoint, errors in the total angular displacement of shaft 19 are held to a value corresponding to the maximum deflection of elastic coupling 39 over the range of torques involved, which is ordinarily less than one revolution, irrespective of the time of operation.

If now it is desired to synchronize the shaft 19 by means of a timing source other than the supply terminals 22, the clutch 38 of the rigid driving system is disengaged, the cam 31 of the auxiliary puck driving system 42 is actuated to engage this driving system, and supply terminals 40 are energized by a suitable timing or synchronizing signal. In Fig. 5 there is represented a schematic circuit diagram of an electrical system suitable for use with the precision driving system of Fig. 1 under these conditions. In the system of Fig. 5, the reference timing source comprises means for generating a periodic signal of a nominal frequency accurately related to, for example, equal to, that of the supply terminals 22 and varying in phase with deviations in the instantaneous speed of the flywheel 18 and the associated magnetic tape 13 from normal during the recording process. Preferably the system includes means operative during recording for impressing on the magnetic record tape itself a reference timing signal. This system has the advantage that any stretching or contraction of the magnetic tape between the recording and the reproducing process is automatically compensated for by corresponding variations in the apparent frequency of the timing signal impressed upon the tape.

Specifically, the electrical system of Fig. 5 includes means for generating a periodic carrier signal outside the acoustical range of the apparatus and means for modulating such carrier signal with a periodic signal of a frequency corresponding to the recording speed of a coupled driving member. Specifically, these means comprise a 14.5-kilocycle modulated oscillator unit 50 including an oscillator of any conventional type modulated, as indicated schematically, by a 60-cycle signal derived from the supply terminals 22 from which is energized the precision driving apparatus described above for driving the apparatus during recording. The output of the modulated oscillator 50 is passed through a low-pass filter 51, the output of which is impressed on a voltage divider 52 having an adjustable contact 52a. An adjustable portion of the modulated 14.5-kilocycle carrier signal is applied from contact 52a through an isolating resistor 53 and a blocking condenser 54 upon the recording head 15 of the recording-reproducing apparatus. With this arrangement, the nominal 60-cycle signal as it appears on the magnetic tape is modified in wavelength in accordance with any slight deviations of the recording speed from its normal value. The program input to be recorded is applied from input terminal 56 through a volume control resistor 57 and a recording amplifier 58 to the recording head 15 in parallel with the 14.5-kilocycle carrier wave modulated by the 60-cycle timing signal. Since the 14.5-kilocycle carrier wave is outside of the acoustical frequency range for which the apparatus is designed, there is no interference between this carrier wave and the program signal.

The electrical system also includes displacement-responsive means operative during signal reproduction or play-back and including filter means for separating the carrier signal from the signal to be reproduced. Specifically, the play-back signal is applied from a play-back head 15 to an input terminal 60 and thence to an amplifier unit 61 of any desired number of stages. The output of amplifier 61 is applied to a load resistor 62, the signal across which is applied through a coupling condenser 63 to a 14.5-kilocycle rejection filter 64 in series with a voltage-divider or volume control resistor 65 having an adjustable contact 65a. Contact 65a is connected to a further amplifier unit 66 of any desired number of stages, the output of which is connected to a program output signal terminal 67. The 14.5-kilocycle carrier signal developed across the rejection filter 64 is applied through a tuned filter network 68 to an amplifier 69 of an appropriate number of stages and a narrow band-pass filter 70 centered at 14.5 kilocycles.

The displacement-responsive means also includes means for demodulating the carrier signal for deriving the periodic signal corresponding to the recording speed; specifically, there is provided a demodulator or detector unit 71 in which the nominal 60-cycle signal is derived from the modulated 14.5-kilocycle carrier signal, and a limiter 72 for clipping the demodulated signal to a constant amplitude level. The output of limiter 72 is applied through an "Automatic" contact of a switch 73 to a power amplifier unit 74. The displacement-responsive means also includes means responsive to the relative phase of the excitation of the supply circuit and the periodic timing signal, that is, to the relative phase of the demodulated signal and the modulating signal, and an auxiliary driving means for a coupled driving member controlled by the responsive means to limit the maximum displacement between the timing source and a coupled driving member, such as flywheel 18 (Fig. 1). Specifically, the phase-responsive means comprises an auxiliary or control induction motor 41 having one phase winding 41a connected to amplifier 74 through a transformer 75 and a second phase winding 41b connected directly to the supply terminals 22. As described in connection with Fig. 1, during signal reproduction or play-back motor 41 is connected to drive flywheel 18 through an auxiliary non-rigid driving means or mechanism 42.

In case it is desired to provide manual adjustment of the speed of the apparatus during play-back, a signal derived from supply terminals 22 is connected through a double-throw switch 79 and a transformer 76 to a voltage-divider resistor 77 having an adjustable contact 77a from which a signal of either polarity may be derived. Contact 77a is connected through a manual phase-adjusting network 78 and a "Manual" contact of switch 73 to amplifier 74. The motor 21, shown as a two-phase condenser type motor, is connected to be energized directly from supply terminals 22.

In an alternative arrangement, an alternating-current tachometer generator 80 is mounted on, or driven by, shaft 19 and may be connected to transformer 76 through double-throw switch 79. The generator is designed to develop a periodic signal of a frequency exactly equal to that of supply terminals 22 when shaft 19 is rotating exactly at some predetermined value.

The several individual elements of the electrical system of Fig. 5 are entirely conventional so that they have been illustrated only in schematic form and in view of which their individual operation will be apparent to those skilled in the art. Considering the operation of the electrical system as a whole, during the recording process the auxiliary driving system is disengaged as by de-energizing the motor 41 or disengaging its puck driving system 42 by means of its cam 31. The program signal input is applied at the input terminal 56, its volume being adjusted by the resistor 57, and is amplified in the unit 58 and impressed on the recording head 15 in an entirely conventional manner. At the same time the oscillator unit 50 generates a 14.5-kilocycle carrier wave strongly modulated, for example, 85 per cent, at 60 cycles by virtue of its connection to the supply terminals 22, the frequency of this carrier wave lying above the acoustical range of the apparatus. This modulated 14.5-kilocycle wave is passed through the filter unit 51 and the voltage-divider load resistor 52 from which an adjustable portion is applied through a series isolating resistor 53 and blocking condenser 54 to the recording head 15, so that this modulated carrier wave, which constitutes a timing source, is impressed on the tape 13 simultaneously with the sound program being recorded.

In operation of the apparatus to play-back or reproduce the signal recorded as described above, the signal picked up by the play-back head 15 is applied to the signal input terminal 60 from which it is amplified in unit 61 having a load resistor 62. The combined sound signal and timing source signal developed across resistor 62 is applied through a coupling condenser 63 to a 14.5-kilocycle rejection filter 64 in series with a voltage-divider resistor 65. With this combination, the 14.5-kilocycle carrier wave is effectively suppressed from the resistor 65. An adjustable portion of this signal is derived at contact 65a and applied to amplifier 66 from the output terminal 67 of which the sound signal is applied to a conventional sound reproducer (not shown).

Simultaneously the 14.5-kilocycle carrier signal developed across the filter 64 is applied through the 14.5-kilocycle selective network 68, amplifier unit 69, and band-pass filter 70 to the demodulator or detector unit 71, in which the 60-cycle modulation signal is derived. This 60-cycle modulation signal is then applied to a limiter 72, at the output of which appears a 60-cycle timing source signal of a constant amplitude independent of variations in the gain characteristics of various portions of the electrical system. This constant amplitude 60-cycle timing signal is applied through a switch 73 to a power amplifier 74, the output of which is applied through transformer 75 to one phase winding 41a of the auxiliary driving motor 41, the other phase winding 41b of which is connected directly to the supply terminals 22. The four terminals 40 of Fig. 5 correspond to the connection terminals 40 of Fig. 1.

With the connections described, the motor 41 becomes a combined auxiliary power source and phase-responsive element. The operating characteristic of motor 41 for a given operating speed of shaft 19, for example, that corresponding to the normal speed $S_n$, is represented in Fig. 6 in which the abscissae represent the relative phase of the current in the two motor windings 41a, 41b and the ordinates represent the output torque of the motor. Initially it will be assumed that the frequency of supply terminals 22 in exactly the same at the time of recording and at the time of play-back, although this need not necessarily be true. Further it will be assumed that the tape has stretched very slightly between the recording and play-back operations due to variations in temperature, humidity, age, etc., so that, neglecting the correction effected by motor 41 and assuming that the shaft 19 is driven at the same speed during play-back as during recording, the periodic timing signal picked off the tape and derived from the demodulator unit 71 and applied to winding 41a of motor 41 would be of a frequency slightly lower than normal, for example, 59.8 cycles rather than 60 cycles. The currents in the two phase windings of motor 41 would then vary slowly with respect to each other over a range of zero to 360° at a frequency of 0.2 cycle. Obviously, if the tape had contracted between the recording and play-back operations, the rotation of the relative phase of the motor currents would be in the opposite direction. As seen in Fig. 6, the output torque of motor 41 is a maximum when the relative phase of its exciting currents is +90° and −90°. The motor 41 is designed to have sufficient torque and is connected with such polarity that, during the time that such phase is varying from zero to 180°, it is effective to increase the speed of the drive shaft 19 to normal, opposing and preventing any further phase change.

A condition of equilibrium is soon reached, in which the output torque of motor 41 is sufficient to increase the speed of shaft 19 to normal for some given and constant value of relative phase of the motor winding currents. Under these conditions, the frequency of the periodic timing signal derived from the record tape during play-back is exactly equal to the frequency at supply terminals 22 during play-back and the desired synchronism is achieved. In case the frequency of terminals 22 should be different during play-back from that during recording, this difference in frequency algebraically adds to the frequency difference due to the stretching or contraction of the tape, as described above, and is corrected in the same manner.

A better understanding of the fundamental characteristics of the precision driving system embodying the circuit of Fig. 5 and described above is aided by an analysis of its operation. In order to achieve synchronization, the periodic timing signal picked off the tape during play-back must be precisely equal to the frequency at the terminals 22 during play-back. Such synchronization cannot be effected simply by comparing these two signals and using the difference to control motor 41, since such a simple system at most merely reduces the error. It is well known that in a control system operating on a first order error, there is still an error at equilibrium necessary to develop the correcting effect. What is required is that the time-integral of the difference between the frequency of the periodic timing signal and that of supply terminals 22 over any given period of time be maintained within some limiting value independent of time. This criterion may be expressed by the relation:

$$\int_0^T (f_s - f_c)\, dt \neq f(t) \qquad (1)$$

where $f_s$=frequency of supply terminals 22 during play-back $f_c$=frequency of periodic timing signal during play-back The use of a phase control system of the type described inherently achieves this integrating control. By definition frequency is the rate of change of phase. Substituting this definition in Equation 1 gives:

$$\int_0^T \left(\frac{d\phi_s}{dt} - \frac{d\phi_c}{dt}\right) dt = \phi_s - \phi_c \neq f(t) \qquad (2)$$

That is, the relative phase of the motor winding currents is independent of the total time of operation and is maintained within some limiting value which is constant for any given amount of stretch or contraction of the record tape between the recording and play-back operations and for any given difference in frequency of the supply terminals 22 between recording and play-back operations.

In case it is desired to control synchronization of the record tape manually during recording or play-back operations, this is effected by throwing switch 73 (Fig. 5) to the "Manual" position, in which case the apparatus can be synchronized by adjusting contact 71a.

As an alternative to synchronizing the shaft with the supply terminals 22 by a rigid gear system, this can be done electrically by operating switch 79 to connect transformer 76 to the periodic current generator 80 mounted on shaft 19. Within the range of control of the system, the auxiliary motor 41 then holds the speed of shaft 19 at such a value that the frequency of the signal output of generator 80 is exactly equal to that of supply terminals 22 and will maintain the phase difference therebetween within a limiting value in the manner described above. By substituting for the generator 80 another unit designed to generate a frequency equal to that of supply terminals 22 at some other speed, the shaft 19 may be synchronized with supply terminals 22 at such other speed. By providing a series of such generators with different speed ratings, the apparatus can be synchronized over a wide range of speeds and without the use of mechanical gearing or equivalent.

Fig. 7 illustrates schematicaly a modified form of the precision driving system of Fig. 1, in which the auxiliary driving motor 41 and auxiliary puck drive 42 are replaced by an auxiliary driving motor 43 energized from a timing source 40a and a rigid driving system comprising spur gearing 80, 81 or equivalent. Similarly the rigid driving system 32–37, inclusive, of Fig. 1 is replaced by spur gearing 82, 81, or equivalent. The spur gear 81 common to the drives from the motors 21 and 43 is splined on its shaft 83 for axial movement by means of a manual operating lever 84, so that it may be selectively engaged with the driving gear 82 or the driving gear 80.

The operation of the driving system of Fig. 7 is in all respects similar to that of Fig. 1, except that the timing or rating system comprises the auxiliary motor 43 energized from a timing source 40a, rather than the main driving motor 21 energized from supply terminals 22. In this modification, the motor 21 may be of the induction or other non-synchronous type, while the motor 43 may be of the synchronous type energized from a source synchronous with the desired speed of rotation of the shaft 19 or, alternatively, it may be a phase-responsive motor, such as the motor 41 of Fig. 1, energized from an electrical system similar to that of Fig. 5.

While it will be apparent that the precision driving system of the invention is suitable for embodiment in recording-reproducing apparatus of widely varying specifications, there follow certain specifications of a driving system represented by Fig. 1 in which the invention has been satisfactorily embodied:

Motor 21—hysteresis synchronous motor—1800 R. P. M.
Roller 23—1.02 inch diameter.
Flywheel 18—8 inches diameter. } minimum separation ¾ inch.
Pucks 28, 29—neoprene, 60 durometer 1¼ inch diameter; effective gear ratio 8:0.98 plus slip of approximately 2 per cent.
Capstan 16
Shaft 19 } synchronous speed 225 R. P. M.
Tape speed—15 inches/second.
Cog-belt drive 32—37, inc.—Gear ratio 8:1.
Coupling 39—heavy wall red rubber tubing; outer diameter, ⅝ inch; bore, ¼ inch; length, approximately 3 inches.
Flywheel 18, coupling 39—natural period 0.5 to 3 seconds.

Summarizing, it is seen that the precision driving system of the invention has a number of advantageous characteristics. The main driving motor, which may or may not be synchronous, is coupled at approximately the desired ratio to the drive shaft of the capstan through a non-rigid puck driving system. This provides an extremely smooth drive with high damping. The desired synchronous operation of the capstan drive shaft is achieved by an auxiliary driving system, the sole function of which is to control the slip or creepage of the main puck driving system. This auxiliary or rating drive may be coupled to the capstan driving shaft from the main driving source through a soft coupling, as described in connection with Fig. 1, since the main drive provides adequate damping. Alternatively, the auxiliary drive may be provided with a small auxiliary synchronous motor with appropriate gear reduction and an elastic coupling element. As a further alternative, the auxiliary driving system may be energized from a suitable control signal varying with deviations of the capstan drive from desired synchronism, as represented in the electrical system of Fig. 5. In this case, the auxiliary drive effectively becomes a servo or selsyn apparatus. Further, the system may be proportioned so that the auxiliary driving system tends to over-drive or under-drive the capstan shaft with respect to its synchronous speed, although in some applications it is desirable that the auxiliary driving system always work unidirectionally with reference to the main driving system.

While there have been described what are at present considered to be the preferred embodiments of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A precision driving system comprising: a driven output member; power-supply means including a main power source and a reference timing source; a non-rigid driving linkage between said power source and said output member; and a mechanism interconnecting said timing source and said output member and including means responsive to the displacement therebetween and an auxiliary driving means for said output member controlled by said responsive means to limit the maximum displacement between said timing source and said output member.

2. A precision driving system comprising: a driven output member; power-supply means including a main power source and a reference timing source; a resilient puck driving linkage between said power source and said output member; and a mechanism interconnecting said timing source and said output member and including means responsive to the displacement therebetween and an auxiliary resilient puck driving linkage for said output member controlled by said responsive means to limit the maximum displacement between said timing source and said output member.

3. A precision driving system comprising: a driven output member; a driving motor; a non-rigid driving linkage between said motor and said output member; and a mechanism interconnecting said motor and said output member and including means responsive to the displacement therebetween, and an auxiliary driving means for said output member controlled by said responsive means to limit the maximum displacement between said motor and said output member.

4. A precision driving system for operating in synchronism with a periodic electrical supply circuit comprising: a driven output member; a synchronous driving motor adapted to be energized from the supply circuit; a non-rigid driving linkage between said motor and said output member and subject to creepage; and a mechanism interconnecting said motor and said output member and including means responsive to the displacement therebetween, and an auxiliary driving means for said output member controlled by said responsive means to limit the maximum displacement between said motor and said output member.

5. A precision driving system comprising: a driven output member; a driving motor; a resilient puck driving linkage between said motor and said output member; and an auxiliary driving means interconnecting said motor and said output member and including a rigid driving mechanism and a resilient deformable element effective to limit the maximum displacement between said motor and said output member.

6. In an electro-acoustical record-translating apparatus including a rotatable record supporting and driving member, a precision driving system comprising: power-supply means including a main power source and a reference timing source; a non-rigid driving linkage coupled to said power source and adapted to be coupled to a record-driving member; a mechanism interconnecting said timing source and a coupled record-driving member and including means responsive to the displacement therebetween; and an auxiliary driving means for a coupled driving member controlled by said responsive means to limit the maximum displacement between said timing source and a coupled driving member.

7. A precision driving system comprising: a driven output member; power-supply means including a main power source and a reference periodic electrical supply circuit; a non-rigid driving linkage between said power source and said output member; a mechanism for generating a periodic signal of a nominal frequency equal to that of said supply circuit and varying in phase with deviations in speed of said output member from its normal value; means responsive to the relative phase of the excitation of said supply circuit and said periodic signal; and an auxiliary driving means for said output member controlled by said responsive means to limit the maximum displacement between said output member and the excitation of said supply circuit.

8. A precision driving system comprising: a driven output member; power-supply means including a main power source and a reference periodic electrical supply circuit; a non-rigid driving linkage between said power source and said output member; a mechanism for generating a periodic signal of a nominal frequency equal to that of said supply circuit and varying in phase with deviations in speed of said output member from its normal value; an auxiliary phase-responsive driving motor energized jointly by said supply circuit and said periodic signal; and an auxiliary driving means for said output member driven by said auxiliary motor to limit the maximum displacement between said output member and the excitation of said supply circuit.

9. A precision driving system comprising: a driven output member; a periodic electrical supply circuit; a synchronous driving motor; a non-rigid driving linkage between said motor and said output member; a mechanism for generating a periodic signal of a nominal frequency equal to that of said supply circuit and varying in phase with deviations in the instantaneous speed of said output member from its normal value; an auxiliary polyphase induction driving motor having at least one phase winding energized from said supply circuit and at least one phase winding energized by said periodic signal; and an auxiliary driving means for said output member driven by said auxiliary motor to limit the maximum displacement between said timing source and said output member.

10. In an electro-acoustical record recording-reproducing apparatus including a rotatable record supporting and driving member, a precision driving system comprising: power-supply means including a main power source; reference timing means operative during recording for impressing on a record a reference timing signal; a non-rigid driving linkage coupled to said power source and adapted to be coupled to a record driving member; means operative during reproducing and responsive to the relative phase of said timing signal and said power source; and an auxiliary driving means for a coupled driving member controlled by said responsive means to limit the maximum displacement between said timing signal and a coupled driving member.

11. A precision driving system comprising: a driven output member; power-supply means including a main power source; a non-rigid driving linkage between said power source and said output member; a period timing signal generator driven by said output member; means responsive to the relative phase of said timing signal and said power source; and an auxiliary driving means for said output member controlled by said responsive means and effective to limit the maximum displacement between said power source and said output member.

12. In an electro-acoustical record recorder-reproducer apparatus including a rotatable record supporting and driving member, a precision driving system comprising: power-supply means including a main power source; reference timing means operative during recording including means for generating a periodic carrier signal outside the acoustical frequency range of the apparatus, means for modulating said signal with a periodic signal of a frequency corresponding to the recording speed of a coupled driving member, and means for impressing such modulated signal on a record being recorded; a non-rigid driving linkage coupled to said power source and adapted to be coupled to a record driving member; means operative during reproducing including filter means for separating said carrier signal from the signal to be reproduced, means for demodulating said carrier signal, and means responsive to the relative phase of said demodulated signal and said modulating signal; and an auxiliary driving means for a coupled driving member controlled by said responsive means to limit the maximum displacement between said timing signal and a coupled driving member.

DONALD G. C. HARE.

REFERENCES CITED

The following references are of record in the file of this patent:

UNITED STATES PATENTS

| Number | Name | Date |
|---|---|---|
| 297,487 | Jenkin | Apr. 22, 1884 |
| 632,421 | Moskowitz | Sept. 5, 1899 |

FOREIGN PATENTS

| Number | Country | Date |
|---|---|---|
| 176,181 | Great Britain | Mar. 9, 1922 |